United States Patent
Roh et al.

(10) Patent No.: US 7,333,631 B2
(45) Date of Patent: Feb. 19, 2008

(54) LANDMARK, APPARATUS, AND METHOD FOR EFFECTIVELY DETERMINING POSITION OF AUTONOMOUS VEHICLES

(75) Inventors: Kyoung-sig Roh, Seongnam (KR); Young Son, Yongin (KR); Ki-cheol Park, Hwaseong-gun (KR); Joo-young Kwak, Seongnam (KR)

(73) Assignee: Samsung Electronics Co., Ltd., Suwon, Kyungki-Do (KR)

( * ) Notice: Subject to any disclaimer, the term of this patent is extended or adjusted under 35 U.S.C. 154(b) by 726 days.

(21) Appl. No.: 10/428,791

(22) Filed: May 5, 2003

(65) Prior Publication Data

US 2004/0062419 A1   Apr. 1, 2004

(30) Foreign Application Priority Data

Oct. 1, 2002   (KR) .................. 10-2002-0059778

(51) Int. Cl.
G06K 9/00   (2006.01)
E01F 9/06   (2006.01)

(52) U.S. Cl. .................. 382/104; 404/12; 404/13; 404/14

(58) Field of Classification Search ........ 382/103–104, 382/106–108, 113, 114; 404/12, 13, 14
See application file for complete search history.

(56) References Cited

U.S. PATENT DOCUMENTS 4,768,088 A * 8/1988 Ando .................. 348/77
5,240,344 A * 8/1993 Green .................. 404/14
5,559,695 A * 9/1996 Daily .................. 701/1
6,025,790 A * 2/2000 Saneyoshi .................. 340/946
6,594,600 B1 * 7/2003 Arnoul et al. .................. 702/94

FOREIGN PATENT DOCUMENTS

JP   10134186   5/1998

OTHER PUBLICATIONS

Notice to Submit Reponse issued by the Korean Patent Office on Oct. 12, 2004 in corresponding application 10-2002-0059778.

* cited by examiner

*Primary Examiner*—Brian Le
(74) *Attorney, Agent, or Firm*—Buchanan Ingersoll & Rooney PC

(57) ABSTRACT

A landmark used to effectively determine the location of an autonomous vehicle, and a self-localization apparatus and method using the landmark are provided. In the self-localization method, first, first and second outer line information and shape information are extracted from a landmark image received from a camera. Next, a projective invariant is calculated from the shape information and stored in a hash table. Thereafter, the calculated projective invariant is compared with reference projective invariants for a plurality of landmarks stored in a predetermined data storage area in the form of a hash table, thereby determining which landmark corresponds to the landmark image. Then, information on the distance and orientation of the determined landmark with respect to the autonomous vehicle is analyzed in response to the first and second outer line information.

4 Claims, 7 Drawing Sheets

LANDMARK, APPARATUS, AND METHOD FOR EFFECTIVELY DETERMINING POSITION OF AUTONOMOUS VEHICLES

This application claims the priority of Korean Patent Application No. 2002-59778, filed on Oct. 1, 2002, in the Korean Intellectual Property Office, the disclosure of which is incorporated herein in its entirety by reference.

BACKGROUND OF THE INVENTION

1. Field of the Invention

The present invention relates to image recognition and tracking performed in application fields using images, such as, automation systems, intelligent vehicle systems, and the like, and more particularly, to a landmark used to effectively determine the location of an autonomous vehicle such as a mobile robot, and a self-localization apparatus and method using the landmark.

2. Description of the Related Art

With an increase in the interest in mobile robots, various types of such robots have been actively developed. Mobile robots are applied to various fields, and must have four functions associated with their movements in order to navigate autonomous vehicles.

The first function is a map building function, the second one is a self-localization or self-positioning function, the third one is an obstacle avoidance function, and the fourth one is a path planning function.

The map building function, by which a map about a given space, that is, a working environment, is built, can be considered essential to plan a work to be allocated to an autonomous vehicle. The self-localization or self-positioning function denotes a function to self-ascertain the present location in order to accomplish a given command, for example, a command "move from the current location to a new space." The obstacle avoidance function denotes sensing and avoiding an unexpected obstacle that occurs during execution of a scheduled work. The path planning function denotes planning a progress of a robot from its initial state to a final target state.

In particular, an autonomous vehicle can be more easily navigated by providing it with accurate information on its location and orientation. The information can be provided to autonomous vehicles by a dead reckoning method using distances and directions, an inertial navigation using an accelerometer and a gyrosenser, and a satellite-based positioning method. However, these methods have drawbacks. For example, the dead reckoning method has a low accuracy due to an accumulation of errors caused by slipping of autonomous vehicles. The inertial navigation has a low accuracy due to an accumulation of errors caused by integration. The satellite-based positioning method requires a secure communications path with a satellite and cannot provide accurate location information necessary for orbit correction.

Besides, a self-positioning method can be used, in which location and orientation information can be provided to autonomous vehicles using landmarks disposed at pre-known locations within a work environment.

The landmarks are read and processed by a vision system, which is carried by an autonomous vehicle. If a landmark is detected and recognized by the vision system, the unique location of the detected landmark is determined, and the location of the autonomous vehicle is determined in accordance with the location of the landmark.

However, current methods using landmarks have some problems. If a working environment is messy or unevenly bright, or if parts of landmarks are occluded, errors occur when the landmarks are detected and recognized. Consequently, errors exist in a determined location of an autonomous vehicle. Also, the current methods using landmarks make it difficult to ascertain information on a location based on the X and Y axes of an image plane and information on an angle made by a camera with each of the landmarks from an acquired landmark image.

SUMMARY OF THE INVENTION

The present invention provides a landmark used to effectively determine the location of an autonomous vehicle within a given space, and a self-localization apparatus and method using the landmark for an autonomous vehicle.

According to an aspect of the present invention, there is provided a landmark including first and second outer line areas and a shape area. The first outer line area is used to ascertain the X and Y axes of an image plane upon self-localization of an autonomous vehicle. The second outer line area is used to ascertain a deviation degree between a camera and a landmark upon acquisition of the image plane. The shape area represents the unique shape of the landmark.

According to another aspect of the present invention, there is provided an apparatus for determining the location of an autonomous vehicle. In the apparatus, a feature data extractor extracts first and second outer line information and shape information from a landmark image received from a camera. A projective invariant calculator calculates a projective invariant from the shape information. A data storage unit stores the calculated projective invariant and reference projective invariants for a plurality of landmarks in the form of a hash table. A hash table search unit determines which landmark corresponds to the landmark image by comparing the calculated projective invariant with the reference projective invariants for the plurality of reference landmarks. A distance/orientation information analyzer analyzes information on the distance and orientation of the determined landmark with respect to the autonomous vehicle in response to the first and second outer line information.

According to still another aspect of the present invention, there is provided an autonomous vehicle having a self-localization function. In the autonomous vehicle, an image acquiring unit captures a landmark image received from a camera in a predetermined image format. A main controller performs a self-localization function and an overall control for operating the autonomous vehicle, in response to the landmark image captured by the image acquiring unit. A movement controller controls the movement of the autonomous vehicle in response to the control of the main controller. The main controller includes a feature data extractor, a projective invariant calculator, a data storage unit, a hash table search unit, and a distance/orientation information analyzer. The feature extractor extracts first and second outer line information and shape information from the landmark image. The projective invariant calculator calculates a projective invariant from the shape information. The data storage unit stores the calculated projective invariant and reference projective invariants for a plurality of landmarks in the form of a hash table. The hash table search unit determines which landmark corresponds to the landmark image by comparing the calculated projective invariant with the projective invariants for the plurality of reference landmarks. The distance/orientation information analyzer analyzes information on the distance and orientation of the determined landmark with respect to the autonomous vehicle in response to the first and second outer line information.

According to yet another aspect of the present invention, there is provided a method of determining the location of an autonomous vehicle. In the method, first and second outer line information and shape information are extracted from a landmark image received from a camera. Next, a projective invariant is calculated from the shape information and storing the projective invariant in the form of a hash table. Thereafter, it is determined which landmark corresponds to the landmark image by comparing the calculated projective invariant with projective invariants for a plurality of reference landmarks stored in a predetermined data storage area in the form of a hash table. Then, information on the distance and orientation between the determined landmark and the autonomous vehicle is analyzed in response to the first and second outer line information.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
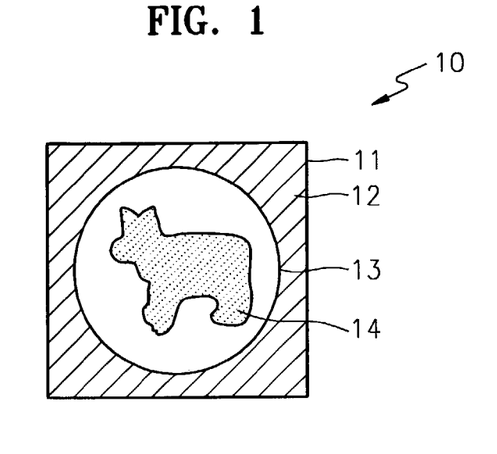
FIG. 1 shows a configuration of a landmark according to a preferred embodiment of the present invention.
Figure 2:
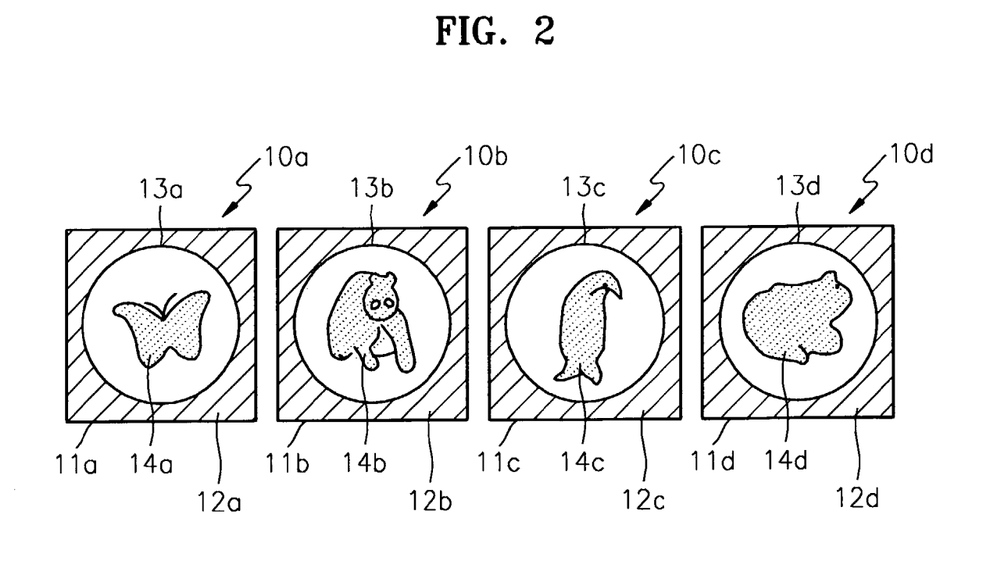
FIG. 2 shows various landmarks according to the present invention.

FIG. 1 shows a configuration of a landmark 10 according to a preferred embodiment of the present invention. FIG. 2 shows various landmarks 10a through 10d according to the present invention.

Referring to FIG. 1, the landmark 10 includes a first outer line area 11, a color area 12, a second outer line area 13, and a shape area 14. The first outer line area 11 corresponds to the outer line of the landmark 10 in a rectangular shape and is used as an index for indicating the X and Y axes of an image plane upon self-localization of an autonomous vehicle. The second outer line area 13 is formed in a perfect circular shape with a predetermined radius. To ascertain a degree of deviation between a camera and an object, a deformation of the circle 13 generated upon projection of the camera upon the landmark 10 is analyzed, that is, a phenomenon where a perfect circle appears to be an oval is analyzed. The color area 12, which exists between the first and second outer line areas, is represented in different colors for different landmarks, thus contributing to an easy, quick distinction of the landmarks. The shape area 14 represents different shapes for different landmarks in order to distinguish between the landmarks. An object drawn in the shape area 14 may be a simple geometrical shape, symbol, or figure. However, since a self-localizing apparatus and a self-localizing method according to the present invention can perform an accurate recognition of complicated landmarks as well as simple landmarks, a landmark with a complicated shape can be taken as an example.

Referring to FIG. 2, first through fourth landmarks 10a through 10d include different color areas 12a through 12d, respectively, and different objects, that is, a butterfly 14a, a bear 14b, a bird 14c, and a frog 14d, respectively. If a working environment is the inside of a house, the first landmark 10a with a butterfly picture represents a kitchen, the second landmark 10b with a bear picture represents a warehouse, the third landmark 10c with a bird picture represents a living room, and the fourth landmark 10d with a frog picture represents a bedroom, an autonomous vehicle can determine its location within the house by recognizing the first through fourth landmarks 10a through 10d. Here, in the self-localizing apparatus and the self-localizing method according to the present invention, projection invariant information which is not affected by peripheral environments or noise upon extraction of location information is used, and accordingly, an accurate location can be determined even if a landmark image acquired by an autonomous vehicle 100 is distorted.

Figure 3:
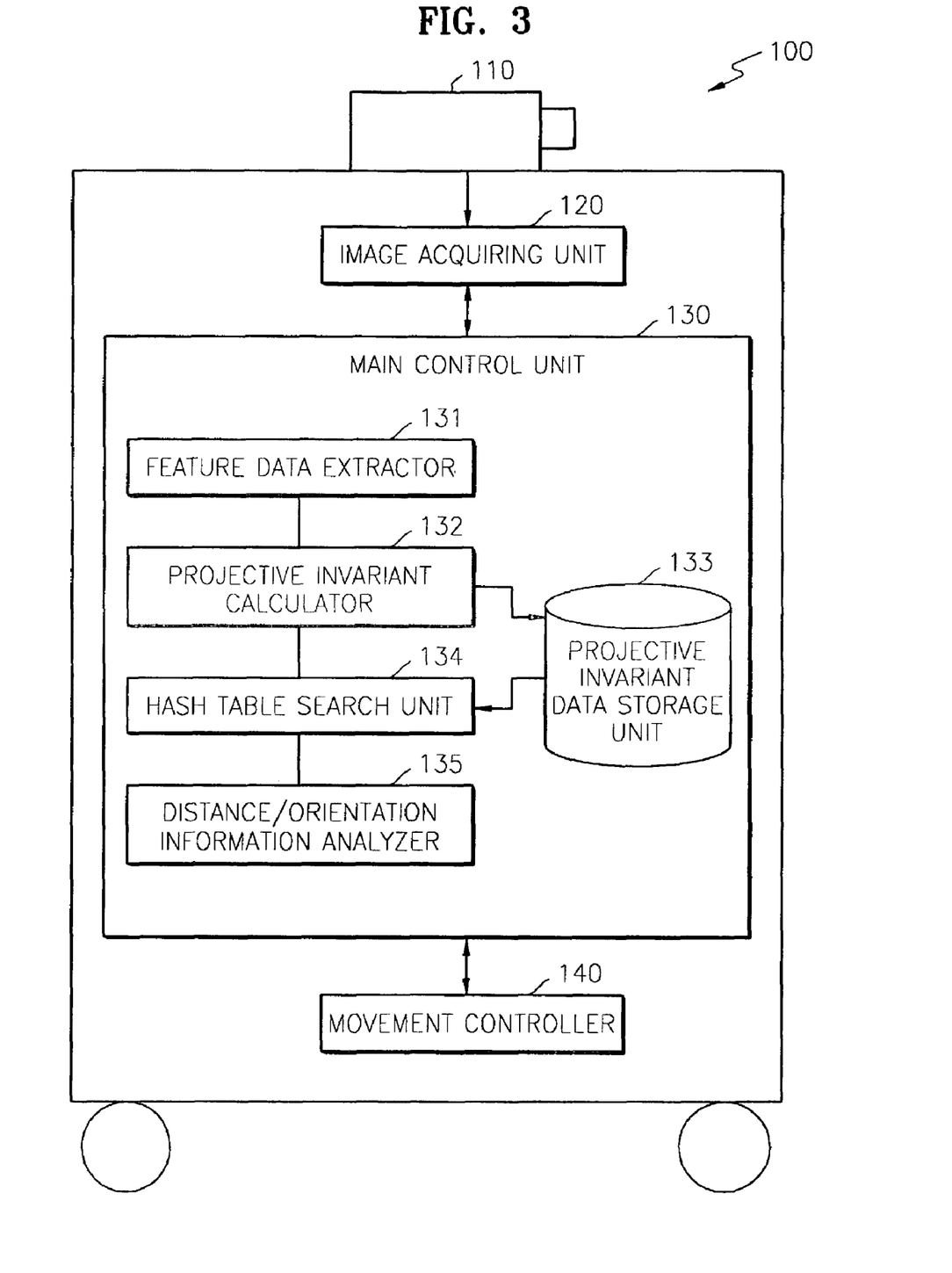
FIG. 3 is a block diagram showing an example of an autonomous vehicle having a self-localization function, according to a preferred embodiment of the present invention.

FIG. 3 is a block diagram showing the autonomous vehicle 100 having a self-localization function according to a preferred embodiment of the present invention. Referring to FIG. 3, the autonomous vehicle 100 includes a camera 110, an image acquiring unit 120, a main control unit 130, and a movement controller 140.

The camera 110 may be a standard charge-coupled device (CCD) camera or a web camera in which an Internet server and a camera are combined. Web cameras generate distorted images quite frequently as compared with general CCD cameras, but can be easily popularized by virtue of their low prices. Because the autonomous vehicle 100 according to the present invention uses projection invariant information which is not affected by peripheral environments or noise upon recognition of a landmark, excellent recognition results can be obtained even if a low-priced web camera is used instead of an expensive CCD camera as the camera 100. Thus, self-localization of an autonomous vehicle can be economically accomplished.

The image acquiring unit 120 is connected to the camera 110 and captures an image received from the camera 100 into a predetermined image format. An image acquired by the image acquiring unit 120 is input to the main control unit 130 and used upon recognition of the location of the autonomous vehicle 100.

The main control unit 130 performs an overall control action to operate the autonomous vehicle 100. That is, the main control unit 130 performs a self-localization function in order to effectively control the autonomous vehicle 100. To do this, the main control unit 130 includes a feature data extractor 131, a projective invariant calculator 132, a data storage unit 133, a hash table search unit 134, and a distance/orientation information analyzer 135.

The feature data extractor 131 divides a landmark image acquired by the image acquiring unit 120 into first and second outer line areas and a shape area and extracts first and second outer line information and shape information to serve as feature data for self-localization from the first and second outer line areas and the shape area, respectively. The projective invariant calculator 132 calculates a projective invariant from the shape information and stores the calculated projective invariant in the form of a hash table in the data storage unit 133. The projective invariant maintains a constant value without being affected by a deformation of a landmark image caused by various factors. The data storage unit 133 stores the projective invariant of the landmark image calculated by the projective invariant calculator 132 and also the projective invariants of a plurality of landmarks in the form of a hash table to serve as reference data to be compared with the calculated projective invariant in the form of a hash table. The hash table search unit 134 compares the projective invariant of the landmark image acquired by the camera 110 with the projective invariants of the plurality of landmarks stored as reference data in the form of a hash table in an area of the data storage unit 133 and determines which landmark among the plurality of reference landmarks is identical with the landmark corresponding to the acquired landmark image. The distance/orientation information analyzer 135 analyzes information on the distance and orientation of the landmark of interest with respect to the autonomous vehicle 100 in response to the first and second outer line information extracted by the feature data extractor 131.

The movement controller 140 controls the movement of the autonomous vehicle 100 under the control of the main control unit 130.

Figure 4:
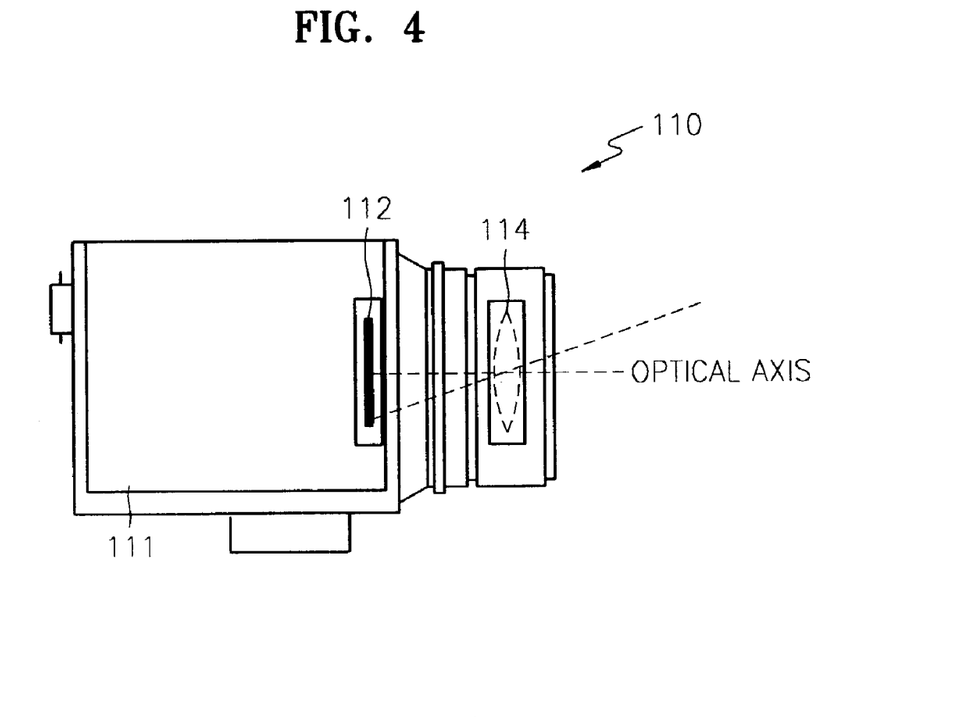
FIG. 4 shows the exterior of the camera of FIG. 3.
Figure 5:
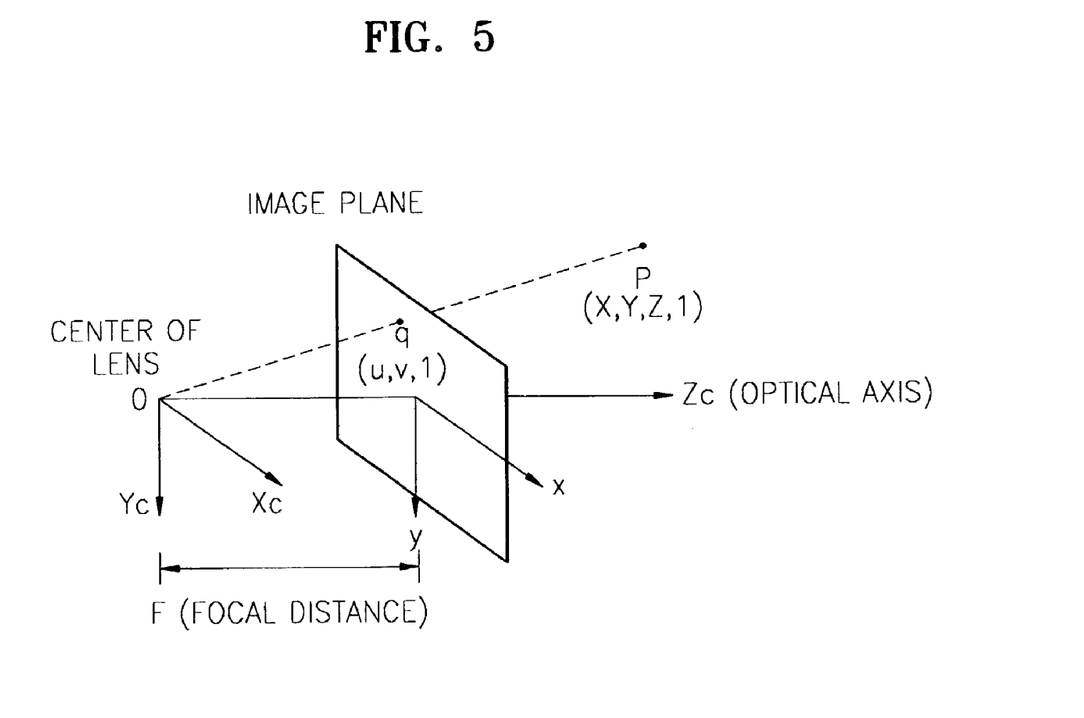
FIG. 5 shows a pin-hall camera model for the camera of FIG. 4.

FIG. 4 shows the exterior of the camera 110 of FIG. 3, and FIG. 5 shows a pin-hall camera model for the camera of FIG. 4. Referring to FIG. 4, the camera 110 is roughly comprised of a main body 111, a CCD array 112, and a lens 114. The lens 114 corresponds to the eye lens of a human being. The CCD array 112 is an image plane on which an image projected through the lens 114 lands, and acts as the retina of a human eye. When the focal point of the lens 114 has been adjusted to the infinity, the distance from the center of the lens 114 to the CCD array 112 is referred to as a focal length, on which the appearance of an image depends. Although it will be described in detail later, the focal length is used as an essential parameter in measuring the distance between a camera and a subject (for example, a landmark).

FIG. 5 shows results of modeling of the components of the camera 110 of FIG. 4 using a pin-hall camera model. A projective transformation expression for an image in the pin-hall camera model can be expressed as in Equation 1:

$$\begin{bmatrix} u \\ v \\ 1 \end{bmatrix} = \frac{1}{t_{31}^X + t_{32}^Y + t_{33}^Z + t_{34}} \begin{bmatrix} t_{11} & t_{12} & t_{13} & t_{14} \\ t_{21} & t_{22} & t_{23} & t_{24} \\ t_{31} & t_{32} & t_{33} & t_{34} \end{bmatrix} \begin{bmatrix} X \\ Y \\ Z \\ 1 \end{bmatrix} \quad (1)$$

wherein (u, v, 1) denotes a coordinate of a point (q) defined on an image plane, (X, Y, Z, 1) denotes a point (P) corresponding to the point (q) on an object coordinate system, and $t_{ij}$ denotes the ij element of a deformation matrix between an object plane and the image plane.

If the object is a two-dimensional plane, that is, Z is equal to 0, Equation 1 is transformed into Equation 2:

$$\begin{bmatrix} u \\ v \\ 1 \end{bmatrix} = \frac{1}{t_{31}X + t_{32}Y + t_{34}} \begin{bmatrix} t_{11} & t_{12} & t_{14} \\ t_{21} & t_{22} & t_{24} \\ t_{31} & t_{32} & t_{34} \end{bmatrix} \begin{bmatrix} X \\ Y \\ 1 \end{bmatrix} \quad (2)$$

As shown in Equations 1 and 2, a process of acquiring an image from the object has nonlinear characteristics. However, the self-positioning apparatus and method according to the present invention are not affected by the nonlinear characteristics that are represented during image acquisition and have robust characteristics against noise or a change in the inclination angle of an image.

Figure 6:
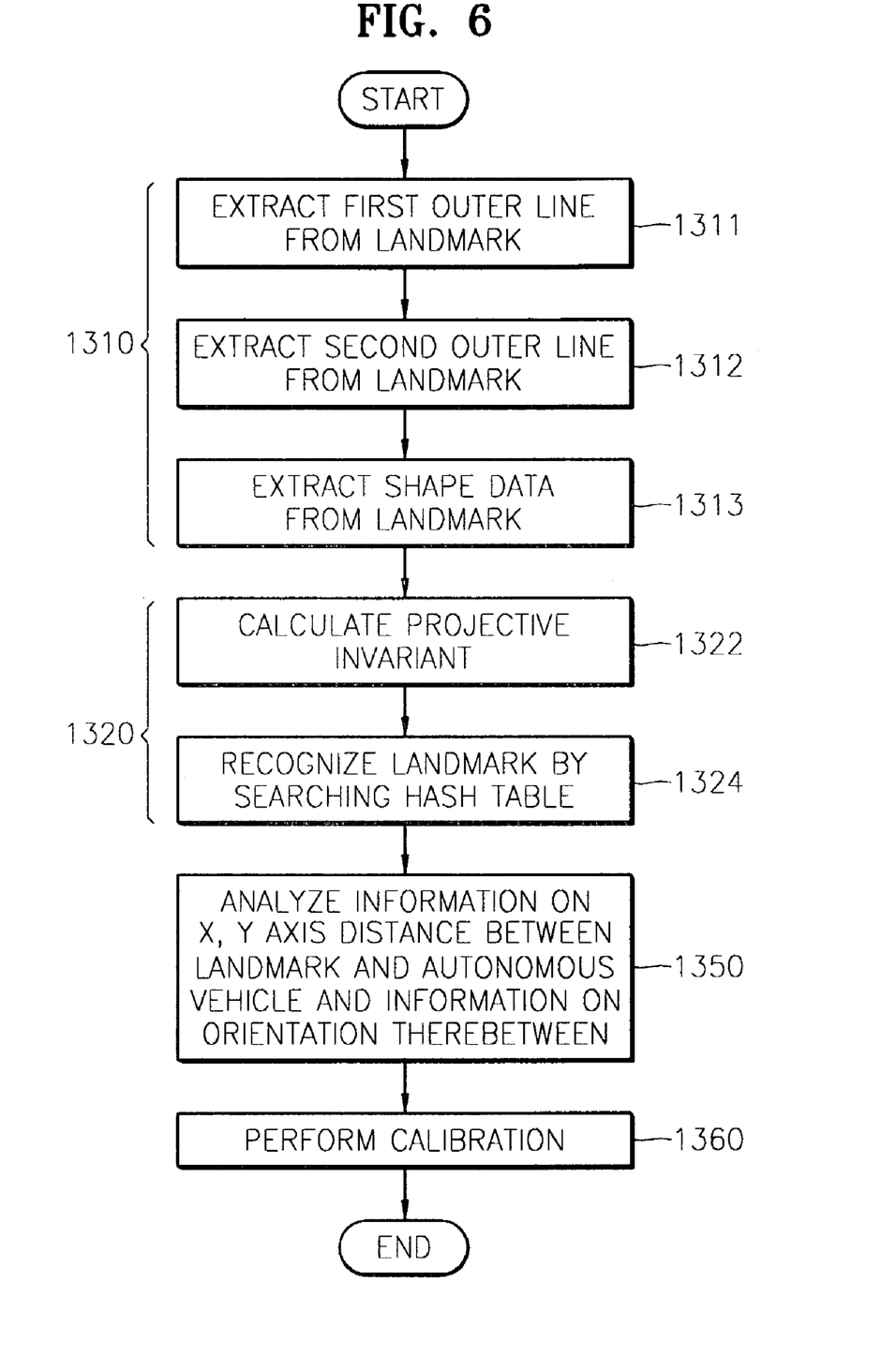
FIG. 6 is a flowchart illustrating a self-localization method performed in the main control unit of FIG. 3.

FIG. 6 is a flowchart illustrating a self-localization method performed in the main control unit 130 of FIG. 3. Referring to FIG. 6, in step 1310, feature data necessary for landmark recognition is extracted from a landmark image acquired by the camera 110. In step 1320, the feature data extracted from the landmark image is compared with the feature data of reference landmark images pre-defined in a predetermined data storage area in order to recognize which landmark among a plurality of landmarks corresponds to the landmark image acquired by the camera 110. The feature data of the landmark image is stored in the form of a hash table in order to facilitate a fast search.

In step 1350, after the location of the autonomous vehicle 100 is roughly recognized by landmark recognition performed in step 1320, information on the distance and orientation between the recognized landmark and the autonomous vehicle 100 is analyzed to recognize the detailed location of the autonomous vehicle 100. Thereafter, in step 1360, a calibration is performed to convert a distance value in the image plane (X and Y axes) calculated in step 1350 into a physical distance value in a real space.

The landmark feature data extraction performed in step 1310 will now be described in greater detail.

Figure 7:
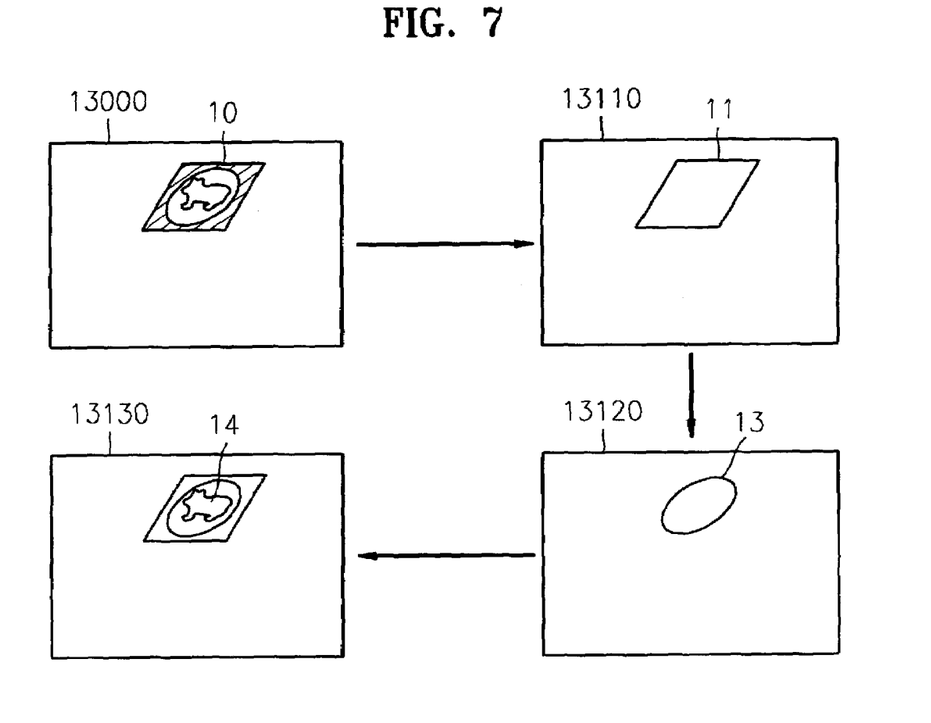
FIG. 7 shows a process of extracting feature data to be used upon self-localization from a landmark image acquired by a camera.

FIG. 7 shows a process of extracting feature data to be used upon self-localization from a landmark image 13000 acquired by the camera 110. Referring to FIGS. 6 and 7, in step 1311, the first outer line area 11 having a rectangular shape is extracted from the landmark image 13000 acquired by the camera 110. Then, in step 1312, the second outer line area 13 having a circular (or oval) shape is extracted from the landmark image 13000. Thereafter, in step 1313, the shape area 14 is extracted from the landmark image 13000.

The first rectangular outer line area 11 extracted in step 1311 is used to distinguish between the X and Y axes of an acquired image. The second outer line area 13 is used to ascertain an angle formed between a camera and an object by analyzing a distortion of a circle caused upon camera projection upon a landmark.

In step 1350, the information on the extracted first and second outer line areas 11 and 13 is analyzed to ascertain information on the detailed location of the autonomous vehicle 100. This step will be described later in greater detail with reference to FIG. 12.

The shape area of the landmark image extracted in step 1313 is used in step 1320 of recognizing which landmark corresponds to the landmark image. In step 1322, a projective invariant is calculated from the shape area of the acquired landmark image and stored in a predetermined data storage area in the form of a hash table. Here, the predetermined data storage area has already stored projective invariant values for the landmarks in the form of a hash table. The pre-stored projective invariants values are compared with the projective invariant of the acquired landmark image so as to recognize which landmark corresponds to the acquired landmark image. In other words, in step 1324, the projective invariant obtained in step 1322 is compared with the projective invariants of the individual landmarks stored as reference data in the hash table in order to recognize which landmark corresponds to the acquired landmark image.

If it is recognized in step 1324 that the acquired landmark image corresponds to a living room among various places inside the house, it is roughly recognized that the autonomous vehicle 100 is located in the living room. Here, the detailed location of the autonomous vehicle 100 in the living room is obtained by the analysis of the first and second outer line areas 11 and 13 as described above.

Figure 8:
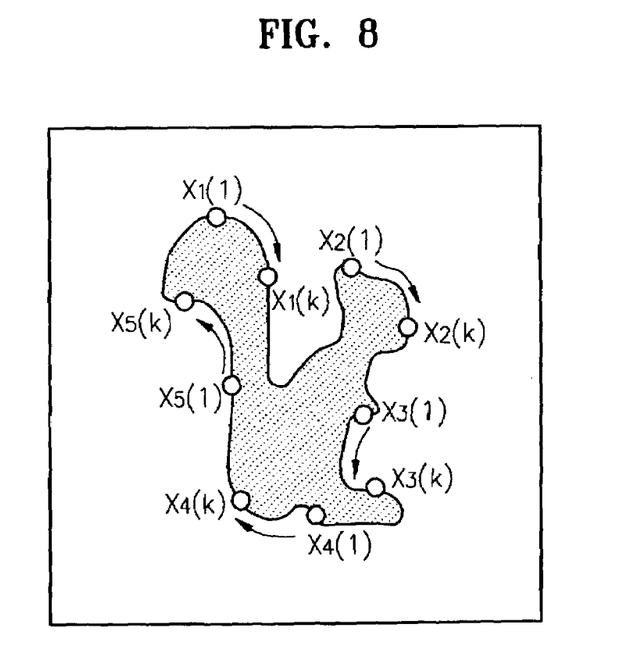
FIG. 8 is a view for explaining a projective invariant calculation method performed in step 1322 of FIG. 6.
Figure 9:
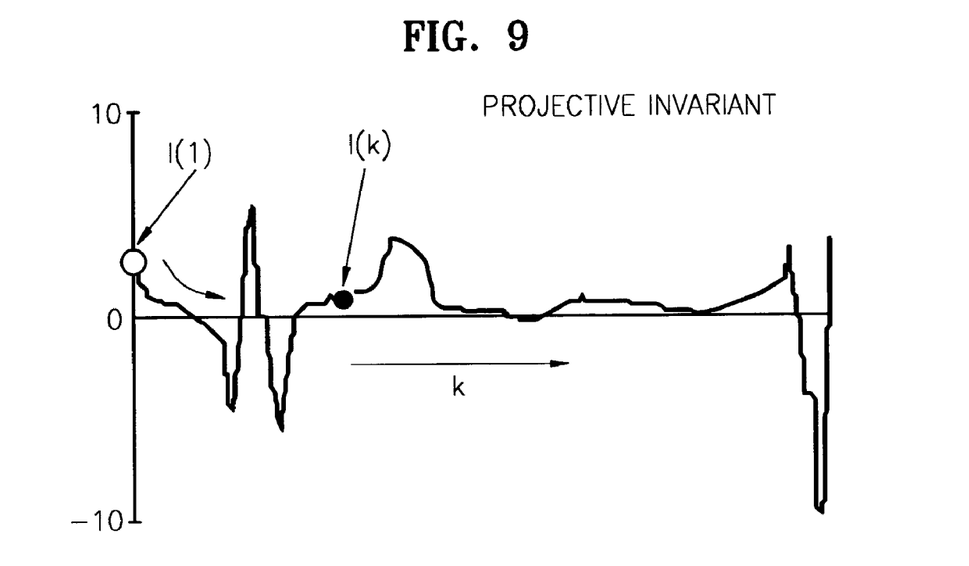
FIG. 9 is a graph showing the result of the calculation of a projective invariant for the shape of the landmark of FIG. 8.

FIG. 8 is a view for explaining a projective invariant calculation method performed in step 1322 of FIG. 6. FIG. 9 is a graph showing the result of the calculation of a projective invariant for the shape of the landmark of FIG. 8.

A projective invariant I used as a reference parameter upon landmark recognition according to the present invention is calculated by using Equation 3:

$$I = \frac{\det(q_5 q_1 q_4)\det(q_5 q_2 q_3)}{\det(q_5 q_1 q_3)\det(q_5 q_2 q_4)} = \frac{\det(P_5 P_1 P_4)\det(P_5 P_2 P_3)}{\det(P_5 P_1 P_3)\det(P_5 P_2 P_4)} \quad (3)$$

wherein P denotes an object point, and q denotes an image point corresponding to the object point P (see FIG. 5). Det (·) in Equation 3 is defined as in Equation 4:

$$\det(q_1 q_2 q_3) = f\begin{bmatrix} x_1 & x_2 & x_3 \\ y_1 & y_2 & y_3 \\ 1 & 1 & 1 \end{bmatrix} \quad (4)$$

$$\det(P_1 P_2 P_3) = f\begin{bmatrix} X_1 & X_2 & X_3 \\ Y_1 & Y_2 & Y_3 \\ 1 & 1 & 1 \end{bmatrix} = 2^k (\text{Area of } \Delta P_1 P_2 P_3)$$

The projective invariant expressed as in Equations 3 and 4, which is information unchangeable even upon nonlinear deformation as shown in Equation 2, denotes information which basically does not vary even if an image acquired by a camera is deformed.

A process of calculating a projective invariant from a landmark image acquired by a camera will now be described with reference to FIG. 8. First, an outer line is extracted from a landmark image of FIG. 8 and equally divided into five sections. The coordinates of points $X_1(1)$, $X_1(k)$, $X_2(1)$, $X_2(k)$, $X_3(1)$, $X_3(k)$, $X_4(1)$, $X_4(k)$, $X_5(1)$, and $X_5(k)$ that constitute the five sections are obtained, and then a projective invariant is calculated based on Equations 3 and 4. To be more specific, upon calculation of the projective invariant, the points $X_1(1)$, $X_1(k)$, $X_2(1)$, $X_2(k)$, $X_3(1)$, $X_3(k)$, $X_4(1)$, $X_4(k)$, $X_5(1)$, and $X_5(k)$ move by 1/N times of the length of the outer line of the landmark shape along the outer line thereof until they reach their initial locations. The moving points $X_1(1)$, $X_1(k)$, $X_2(1)$, $X_2(k)$, $X_3(1)$, $X_3(k)$, $X_4(1)$, $X_4(k)$, $X_5(1)$, and $X_5(k)$ are substituted into Equation 3, thereby obtaining Equation 5:

$$I(k) = \frac{\det(X_5 X_1 X_4)\det(X_5 X_2 X_3)}{\det(X_5 X_1 X_3)\det(X_5 X_2 X_4)} \quad (5)$$

where, $$X_1(k) = (X(k), Y(k), 1),$$

$$X_2(k) = \left(X\left(\frac{N}{5}+k\right), Y\left(\frac{N}{5}+k\right), 1\right),$$

$$X_3(k) = \left(X\left(\frac{2N}{5}+k\right), Y\left(\frac{2N}{5}+k\right), 1\right),$$

$$X_4(k) = \left(X\left(\frac{3N}{5}+k\right), Y\left(\frac{3N}{5}+k\right), 1\right),$$

$$X_5(k) = \left(X\left(\frac{4N}{5}+k\right), Y\left(\frac{4N}{5}+k\right), 1\right)$$

wherein $1 \leq k \leq N$, and X(k) and Y(k) denote X- and Y-axis coordinate functions, respectively, of the outer line of a landmark image.

The projective invariant of the landmark shape of FIG. 8 obtained in the above-described method is shown in the graph of FIG. 9. The projective invariant shown in FIG. 9 is maintained constantly even if the landmark image acquired by a camera is deformed. Thus, if the projective invariant is used upon landmark recognition, accurate self-localization can be achieved even when landmark images having nonlinear characteristics such as a pin-hall camera model are used.

Figure 10:
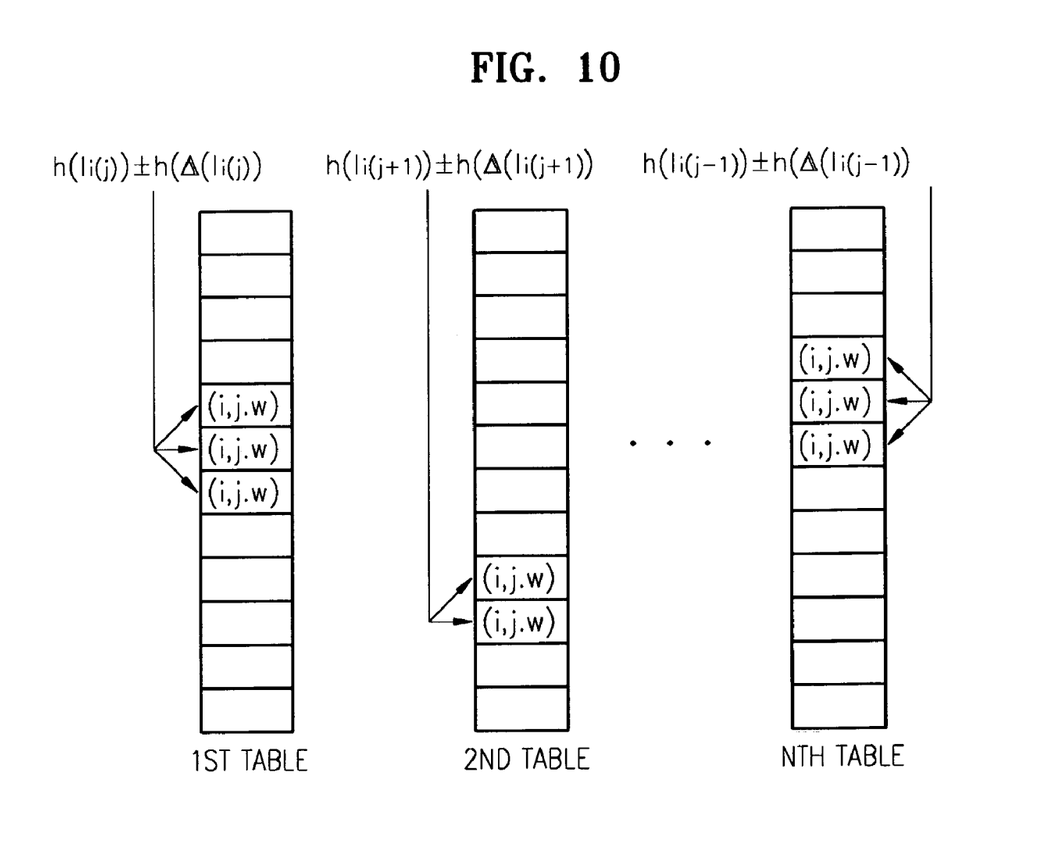
FIG. 10 shows hash tables in which the projective invariants of individual landmarks are established as reference values in order to recognize landmarks.
Figure 11:
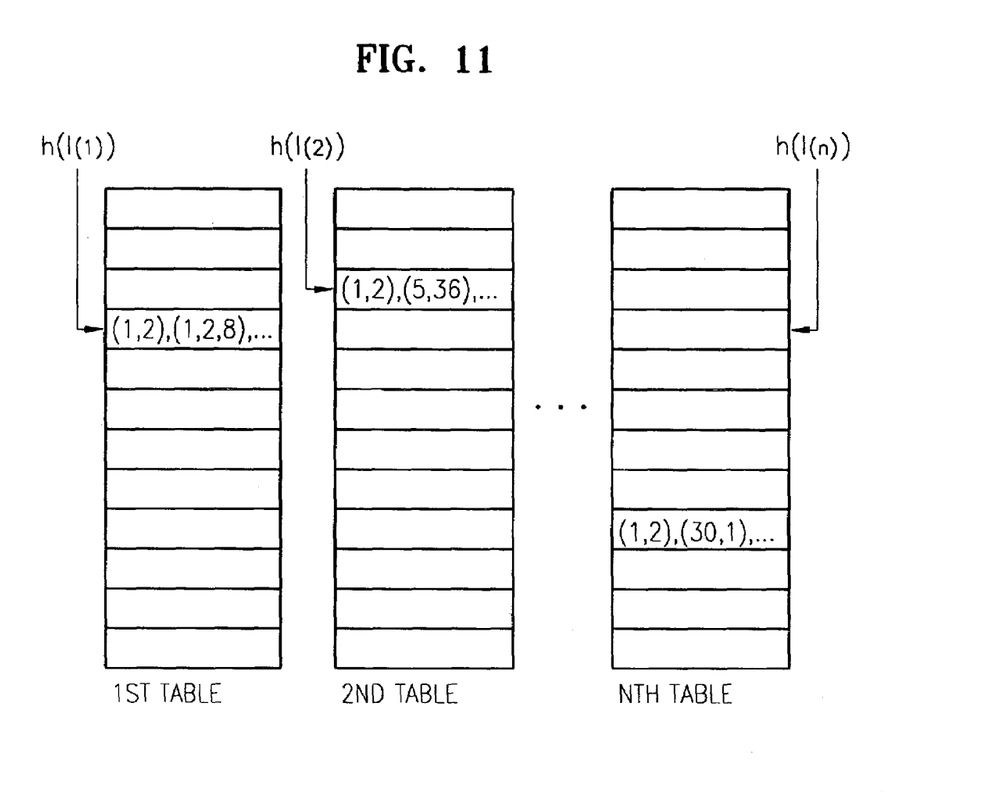
FIG. 11 shows hash tables in which the projective invariants of landmarks acquired by a camera are established to recognize landmarks.

FIG. 10 shows hash tables in which the projective invariants of individual landmarks are established as reference values in order to recognize landmarks. FIG. 11 shows hash tables in which the projective invariants of landmarks acquired by a camera are established.

Hashing does not denote a search performed by the comparison between key values but an access to addresses where data have been stored, which are directly calculated from key values. A hash table is comprised of n tables by a hashing function capable of obtaining addresses where data have been stored from key values.

Referring to FIG. 10, if the reference projective invariants of landmarks obtained from the shape of a landmark are expressed as $MD_i(j)=\{I_i(j), I_i(j+1), I_i(j+2), \ldots, I_i(n), \ldots, I_i(j-1)\}$, values corresponding to $h(I_i(j)) \pm h(\Delta I_i(j))$ are stored in the first hash table, and values corresponding to $h(I_i(j+1)) \pm h(\Delta I_i(j+1))$ are stored in the second hash table. Values corresponding to $h(I_i(j-1)) \pm h(\Delta I_i(j-1))$ are stored in the n-th hash table.

Referring to FIG. 11, if a projective invariant obtained from information on a landmark image acquired by a camera are expressed as $SD=\{I(1), I(2), I(3), \ldots, I(n)\}$, values corresponding to $h(I(1))$ are stored in the first hash table, and values corresponding to $h(I(2))$ are stored in the second hash table. Values corresponding to $h(I(n))$ are stored in the n-th hash table. In FIGS. 10 and 11, h(·) denotes a hashing function that denotes the address of a bucket used to store data in a hash table.

As shown in FIGS. 10 and 11, after the reference projective invariants of landmarks and the projective invariant of a landmark image acquired by the camera are stored, the projective invariant of the landmark image acquired by the camera is indexed so as to recognize which projective invariant among the projective invariants of the reference landmarks is similar to the projective invariant of the landmark image acquired by the camera. As a result, a landmark that is the most voted is recognized as the landmark image acquired by the camera. After such landmark recognition, information on the distance and orientation between the recognized landmark and the autonomous vehicle 100 is recognized, which will now be described in greater detail.

Figure 12:
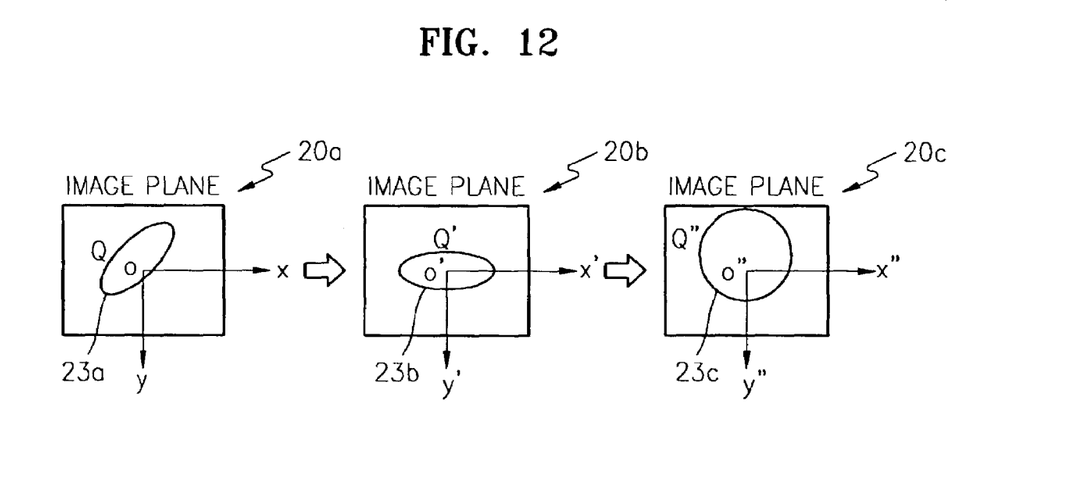
FIG. 12 shows a process of extracting information on the distance and orientation of a landmark with respect to an autonomous vehicle from data on a second outer line (i.e., an oval) which are extracted from a landmark image projected by a camera.

FIG. 12 shows a process of extracting information on the distance and orientation of a landmark with respect to the autonomous vehicle 100 from data on a second outer line (i.e., an oval) which are extracted from a landmark image projected by a camera.

Examples 23a through 23c of a second oval outer line obtained from a landmark image acquired by a camera are shown in FIG. 12. Referring to FIG. 12, the shape of the second outer line (that is, an oval) of a landmark can be a perfect circle 23c, an oval 23b, or an oval 23a inclined by a predetermined angle because of the nonlinearity of the camera.

Such a circular or oval figure can be expressed as in an equation of a quadratic section having two parameters x and y and is referred to as a conic section.

A conic section including a perfect circle and an oval can be expressed in an implicit equation such as Equation 6:

$$S(x,y)=Ax^2+2Bxy+Cy^2+2(Dx+Ey)+F=0 \quad (6)$$

A conic section projected by a camera, that is, a second oval outer line, can be expressed in a matrix format such as Equation 7:

$$Q = k \begin{pmatrix} A & B & D/f \\ B & C & E/f \\ D/f & E/f & F/f^2 \end{pmatrix} \quad (7)$$

wherein f denotes the focal length of the camera, and k denotes an arbitrary non-zero constant.

If a conic section expressed as in Equations 6 and 7 rotates around an arbitrary axis, the relationship between an arbitrary cubic equation (Q) and a cubic equation (Q') for the rotated conic section is expressed as in Equation 8:

$$Q'=k'R^TQR \quad (8)$$

wherein R denotes a rotation matrix.

According to the relationship expressed in Equation 8, three-dimensional information (e.g., distance and orientation information) between a landmark and the autonomous vehicle 100 can be extracted when a landmark image is acquired by the autonomous vehicle 100.

If the second outer line of a landmark has the oval shape 23a inclined by a predetermined angle, the cubic equation for the oval shape 23a is the same as Equation 7. If the oval shape 23a is transformed into an oval located at a standard position as the oval 23b of FIG. 12, the cubic equation (Q) for the oval 23a expressed in Equation 7 is transformed into Equation 9:

$$Q' = k' \begin{pmatrix} 1 & O & O \\ O & \alpha & O \\ O & O & -\gamma/f^2 \end{pmatrix} \quad (9)$$

The relationship equation of two cubic equations Q and Q' is given by Equation 10:

$$Q'=k'U^TQU \quad (10)$$

wherein U is equal to [$U_1$, $U_2$, $U_3$] and denotes a matrix comprised of eigen vectors for an eigen value of a conic equation Q, $\lambda_1$, $\lambda_2$, $\lambda_3$.

A cubic equation used to transform an oval as the oval 23b of FIG. 12 into a perfect circle as the perfect circle 23c of FIG. 12 is given by Equation 11:

$$Q'' = k'' \begin{pmatrix} 1 & O & O \\ O & 1 & c/f \\ O & c/f & (c^2-\rho^2)/f^2 \end{pmatrix} \quad (11)$$

The relationship equation between the cubic equation (Q) of the originally acquired landmark image and the finally-transformed cubic equation (Q') is given by Equation 12:

$$Q''=k''R^TQR \quad (12)$$

wherein R denotes a rotation transformation matrix for axis x'.

As described above, by transforming the cubic equation for a conic section (that is, a second outer line) extracted from a landmark image acquired by a camera, information on the orientation between a landmark and the autonomous vehicle 100 and information on the distance therebetween are obtained using the relationship equation between the cubic equation extracted from the original acquired landmark image and each of the transformed cubic equations Q' and Q". The distance information between a landmark and the autonomous vehicle 100 is obtained using a normal vector (n') on the image plane where the perfect circle 23c of FIG. 12 into which the oval 23b is transformed, a vector (ct') to the center of the perfect circle 23c, and a normal distance (d') to the center of the perfect circle 23c a normal vector (n) for the oval 23a and a vector (ct) and a normal distance (d) to the center of the oval 23a are obtained from the normal vector (n'), vector (ct'), and the normal distance (d') and expressed as in Equations 13, 14, and 15, respectively:

$$n=U\,Rn' \quad (13)$$

$$ct=U\,Rct' \quad (14)$$

$$d=\lambda_1^{3/2}Y \quad (15)$$

wherein n' is $(0\ 0\ 1)^T$, ct' is $(0-dc/f\ d)^T$, c is $\sqrt{(\alpha-1)(\gamma+f^2)}$, $\alpha$ is $$\frac{\lambda_2}{\lambda_1},$$

and γ is $$-f^2 \frac{\lambda_2}{\lambda_1}.$$

$c(=\sqrt{(\alpha-1)(\gamma+f^2)})$ denotes a value used to compensate for the difference between the center coordinate values of the perfect circle 23c and the oval 23b. Information on the distance between the landmark image 20a acquired by a camera and the autonomous vehicle 100 can be obtained by tracing equations backward from the equation for the final perfect circle 23c to the equation for the original oval 23a.

While the present invention has been particularly shown and described with reference to exemplary embodiments concerning self-localization of autonomous vehicles such as mobile robots, the present invention is also applicable to image recognition and tracking performed in image application fields, such as automation systems, intelligent vehicle systems, and the like.

The invention can also be embodied as computer readable codes on a computer readable recording medium. The computer readable recording medium can be any data storage device that can store data which can be thereafter read by a computer system. Examples of the computer readable recording medium include read-only memory (ROM), random-access memory (RAM), CD-ROMs, magnetic tapes, floppy disks, optical data storage devices, and so on. Also, the computer readable codes can be transmitted via a carrier wave such as the Internet. The computer readable recording medium can also be distributed over a network coupled computer systems so that the computer readable code is stored and executed in a distributed fashion.

As described above, in a landmark according to the present invention and a self-localizing apparatus and method using the landmark, accurate self-localization can be performed without being affected by the non-linear characteristics of a camera.

What is claimed is:

1. A landmark disposed at a predetermined location within a work environment of an autonomous vehicle, the landmark comprising:
   a first outer line area having a rectangular shape, wherein the first outer line area in an image of the landmark acquired by a camera of the autonomous vehicle is used to ascertain X and Y axes of an image plane of the acquired image upon self-localization of the autonomous vehicle;
   a second outer line area located within the first outer line area of the landmark and having a circular shape with a predetermined radius, wherein the second outer line area in the acquired image of the landmark is analyzed to ascertain a deviation degree between the camera and the landmark upon acquisition of the image plane; and
   a shape area located within the second outer line area of the landmark comprising a predetermined unique shape that distinguishes the landmark from other landmarks disposed within the work environment, wherein the predetermined shape in the shape area in the acquired image of the landmark is analyzed to recognize which of the landmarks disposed within the work environment corresponds to the acquired landmark image.

2. The landmark of claim 1, wherein the first outer line area has a shape of a rectangle, wherein the X and Y axes of the image plane cross each other at a right angle.

3. The landmark of claim 1, wherein the second outer line area has a shape of a perfect circle with the predetermined radius, wherein deformation of the second outer line area in the acquired image of the landmark is analyzed.

4. The landmark of claim 1, further comprising a color area located between the first and second outer line areas of the landmark and filled with a predetermined color, wherein the predetermined color in the color area in the acquired image of the landmark is analyzed to distinguish the landmarks disposed within the work environment.

* * * * *